No. 12,692. REISSUED SEPT. 3, 1907.

R. G. WINTER.

HINGE.

APPLICATION FILED APR. 29, 1905.

2 SHEETS—SHEET 1.

Witnesses:

Jane Herman Pierson

Gertrude H. Bonk

Inventor

Rudolph G. Winter

By George Hetmore Lee

Attorney

THE NORRIS PETERS CO., WASHINGTON, D. C.

No. 12,692. REISSUED SEPT. 3, 1907.

R. G. WINTER.

HINGE.

APPLICATION FILED APR. 29, 1905.

2 SHEETS—SHEET 2.

Witnesses:

Paul Hermann Pfeiffer

Gertrude H. Brink

Inventor

Rudolph G. Winter

By George W. Moore Jr.

Attorney

THE NORRIS PETERS CO., WASHINGTON, D. C.

UNITED STATES PATENT OFFICE.

RUDOLPH G. WINTER, OF MILWAUKEE, WISCONSIN.

HINGE.

No. 12,692. Specification of Reissued Letters Patent. Reissued Sept. 3, 1907.

Original No. 785,143, dated March 21, 1905, Serial No. 206,791. Application for reissue filed April 29, 1905. Serial No. 258,122.

*To all whom it may concern:*

Be it known that I, RUDOLPH G. WINTER, a citizen of the United States, residing at Milwaukee, in the county of Milwaukee and State of Wisconsin, have invented certain Improvements in Hinges, of which the following is a specification.

This invention relates to selfclosing automatic gravity hinges, or in other words, to those which close or move to a predetermined position under the action of gravity and without the use of springs. In such hinges there are certain predetermined positions, more particularly the closed and the wide open positions, to which the door will return by gravity if moved therefrom.

It is the main object of my present invention to so arrange the coöperating cam-surfaces of the hinge-members that the door, when released after being opened, will quickly start to close, the closing force being greatest when the door is fully opened and diminishing as the door reaches its closed position.

Figure 1:
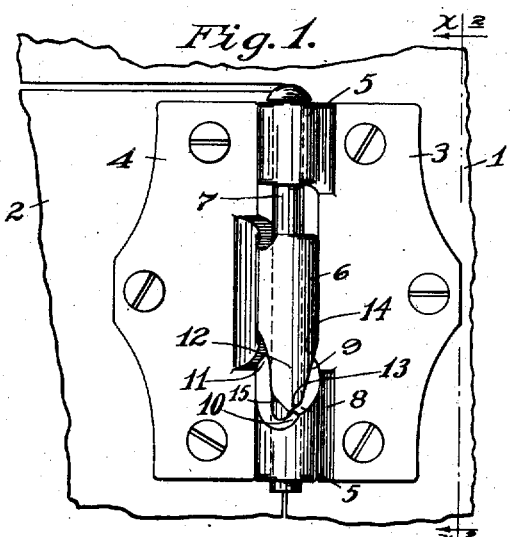
Figure 2:
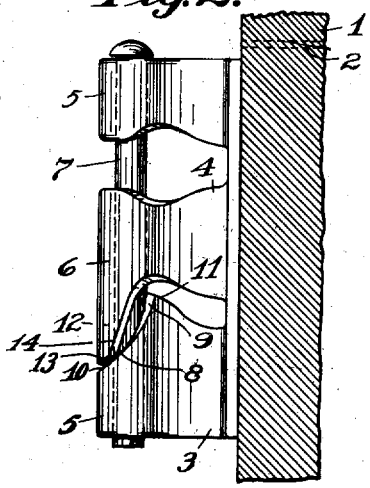
Figure 4:
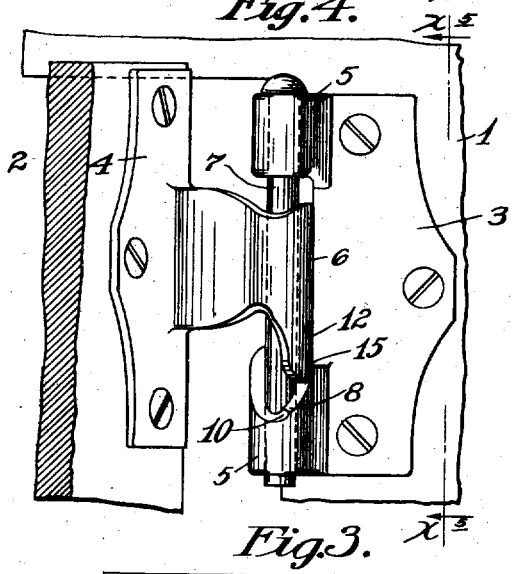
Figure 5:
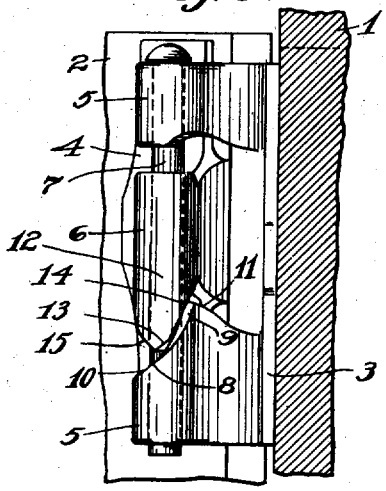
Figure 3:
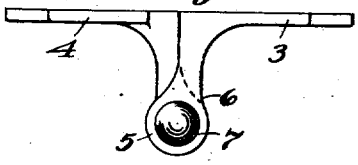
Figure 6:
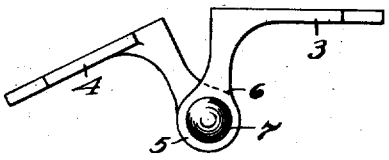
Figure 7:
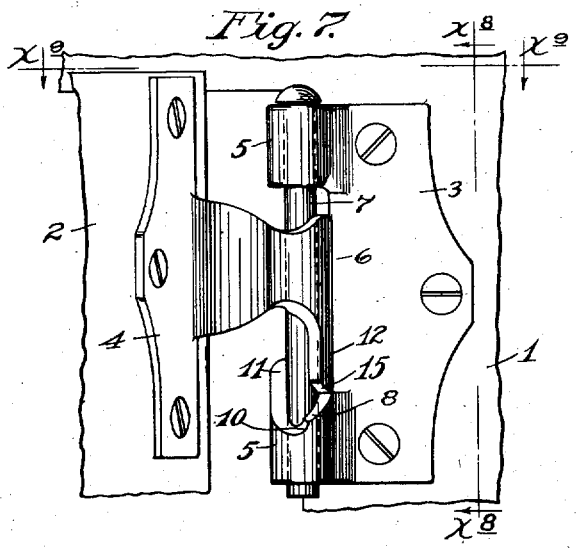
Figure 8:
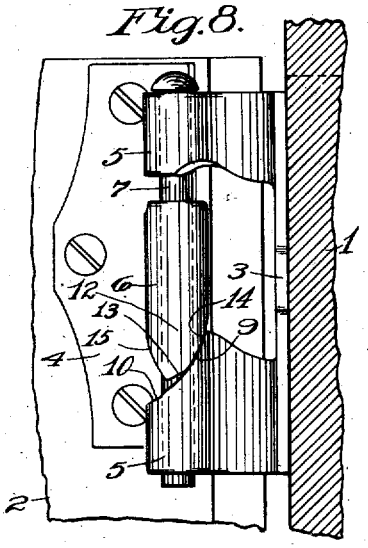
Figure 9:
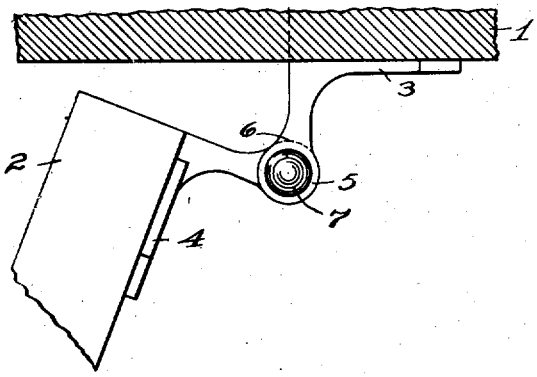

My invention is described clearly in the accompanying drawings which illustrate one embodiment thereof, and in which Figure 1 is a front elevation of a hinge as applied to a door, the latter being closed. Fig. 2 is a side elevation of the same, the door casing being shown in section on the line $x^2$. Fig. 3 is a plan view of the hinge separately in the closed position of the door. Fig. 4 is a view similar to Fig. 1 except that the door is shown in partially open position. Fig. 5 is a view similar to Fig. 2 of the hinge in the position shown in Fig. 4, the section of the casing being taken on line $x^5$. Fig. 6 is a plan view of the hinge separately, in partly open position. Fig. 7 is a front elevation similar to Fig. 1 except that the door is shown in still more open position. Fig. 8 is a side elevation of the hinge shown in the position of Fig. 7, the section through the casing being taken on the line $x^8$. Fig. 9 is a plan view of the hinge and a section through the casing on the line $x^9$, the hinge being shown in the same position as that of Fig. 7.

In the drawings every reference numeral refers always to the same part.

The numeral 1 indicates a door-casing, and the numeral 2 a door, which door is supported from said casing by two or more hinges constructed in accordance with my invention and of which in the drawings only one is shown.

The numerals 3 and 4 indicate the coöperating hinge members, the former of which is secured to the casing and the latter of which is secured to the door. As shown, the hinge member 3 is provided with a pair of laterally-projecting hinge-lugs 5, while the member 4 is provided with a centrally-located single lug 6, which works between the lugs 5. A hinge-bolt 7, passed through the lugs 5 and 6, affords a pivot for the hinge member 4 and the door 2, and permits limited vertical movements thereof.

The lower hinge-lug 5 is formed with a winding cam-surface 8—9, which at its lower extremity is slightly but quite abruptly cut downward at 10. The upper extremity of this cam-surface 8—9 extends to a reverse cam-surface 11. The lug 6 of the hinge member 4 is formed with a depending cam-lug 12, which is formed with cam-surfaces 13, 14, and 15. The portion 9 of the cam-surface 8—9 is much steeper than the portion 8. The cam-surface 14 of the cam-lug 12 has the same curve as the said cam-surface 9; but when the hinge stands in a position to close the door, as shown in Figs. 1, 2, and 3, said cam-surfaces 9 and 14 are held out of engagement by the engagement of the cam-nosed section 13 with the lower portion of the cam-surface 8. (See particularly Fig. 2.) Again, by reference particularly to Fig. 1 it will be noted that when the door is closed a portion of the cam-nose 13 overlies the depressed section 10 of the hub 5, so that the door is supported entirely by the cam-surface 8, and the entire weight of the door is rendered effective to hold the door closed. Furthermore, in view of this depression 10 wear of the surface 8 will not prevent this result.

In Figs. 4, 5, and 6, the door is shown as opened but slightly, and hence has been raised but slightly, and by reference to Fig. 5 it will be noted that the cam-nose 13 still engages with the cam-surface 8 and that the cam-surface 14 has not been yet brought into contact with the cam-surface 9.

In Figs. 7, 8, and 9. the door is shown as turned open far enough to carry its inner corner beyond the casing, and by reference to Fig. 8 it will be noted that in this position of the parts the cam-surface 14 has been brought into engagement with the cam-surface 9, so that under further opening movement of the door these relatively steep engaged cam-surfaces will cause the door to rise rapidly. When the door has been swung nearly to its extreme open position, the cam-nose 13 of the hinge-lug 6 will be carried into engagement with the reverse cam-surface 11 of the lower lug 5, and this engagement will tend to swing the door to its extreme open position, and hence, of course to hold the door in its open position until force is applied thereto.

From the foregoing description it will be seen that the door having been opened to about ninety degrees, and released, will immediately start to shut with great acceleration owing to the steepness of the coöperating surfaces 9 and 14, whereas as the door turns inwardly the coöperating surfaces become less steep until the nose 13 rests upon the surface 8. The purpose of this is to cause a quick closure without undue slamming. Moreover the rising movement of the door is slow so long as the upper edge of the door is still under the casing thereof, whereas it takes place rapidly so soon as the edge of the door is turned far enough out to clear the casing. When the door is opened beyond about a hundred degrees or such point as may be predetermined, the nose 13 passes over the upper end of the surface 9 and passes over on the other side, bringing the cam-surfaces 15 and 11 into play and causing the door to swing wide open and remain there. The function of the depression 10 at the end of the surface 8 is to form a clearance for the nose 13, to permit the latter to pass slightly over the end of surface 8. This prevents the formation of a rut or notch by wear in surface 8 which would to some extent interfere with its action and exercise a closing tendency upon the hinge.

The hinge described, it will of course be understood, is capable of modification within the scope of my invention as herein set forth and claimed. The cam-surfaces of the hinge-lugs, instead of being formed directly on integral parts of the hinge-members, may be formed on separable parts, as shown in my prior patent No. 785,142, granted March 21, 1905. Again, the said novel cam-surfaces may be applied to double hinges or hinges adapting the door to swing in either of two directions, which type of hinges is also disclosed in my said prior patent. Furthermore, the hinge-lugs may be offset from the sides of the door in different ways. Other modifications will suggest themselves in different applications of the hinge.

What I claim as new and desire to secure by Letters Patent is:

1. In a gravity-acting hinge, the combination with the hinge members, one thereof having a cam-surface 8—9, the other member having a cam-nose 13 and cam-surface 14, which nose 13 and cam-surface 8 engage in one extreme position of the hinge, and hold the cam-surfaces 9 and 14 out of contact, but which cam-surfaces 9 and 14 are brought into engagement by movement of the hinge members on their pivot, substantially as described.

2. In a gravity-actuated hinge, the combination with a pair of hinge-members, the one having perforated lugs 5, and the other having a perforated lug 6 connected by a bolt 7, one of said lugs 5 having the cam-surface 8—9 and 11, and depression 10, and the said lug 6 having the cam-nose 13, cam-surface 14 and cam-surface 15, said nose 13 and cam-surface 8 adapted to normally engage and hold said cam-surfaces 9 and 14 out of contact, said surfaces 9 and 14 being engageable by a pivotal movement of one hinge-member with respect to the other, and said cam-surfaces 11 and 15 being engageable by an extreme pivotal movement of one of the said hinge-members, substantially as described.

3. A gravity-acting hinge comprising a pair of leaves having lugs connected together on a vertical pivot, the lug on the fixed leaf having a cam-surface, and the lug on the swinging leaf having a projecting part coöperating with said surface; said surface being comparatively steep on that portion thereof on which said projecting part rests in the open position of the door, and less steep on that portion thereof whereon said projecting part rests in the closed position of the door, and said fixed lug having further a cut-out portion or depression 10 at the lower end of said cam-surface.

4. A gravity-acting hinge comprising a pair of leaves having lugs connected together on a vertical pivot, the lug on the fixed leaf having a cam-surface, and the lug on the swinging leaf having a projecting part coöperating with said surface, said surface being comparatively steep on that portion thereof on which said projecting part rests in the open position of the door, and less steep on that portion thereof whereon said projecting part rests in the closed position of the door; said fixed lug having further a second cam-surface sloping in the opposite direction on which said projecting part of the pivoted lug is adapted to rest in the extreme open position of the door.

In witness whereof I have hereto set my hand in presence of two witnesses.

RUDOLPH G. WINTER.

In presense of—
F. W. W. ALLBER,
GEORGE W. COLLES.